Figure 1:
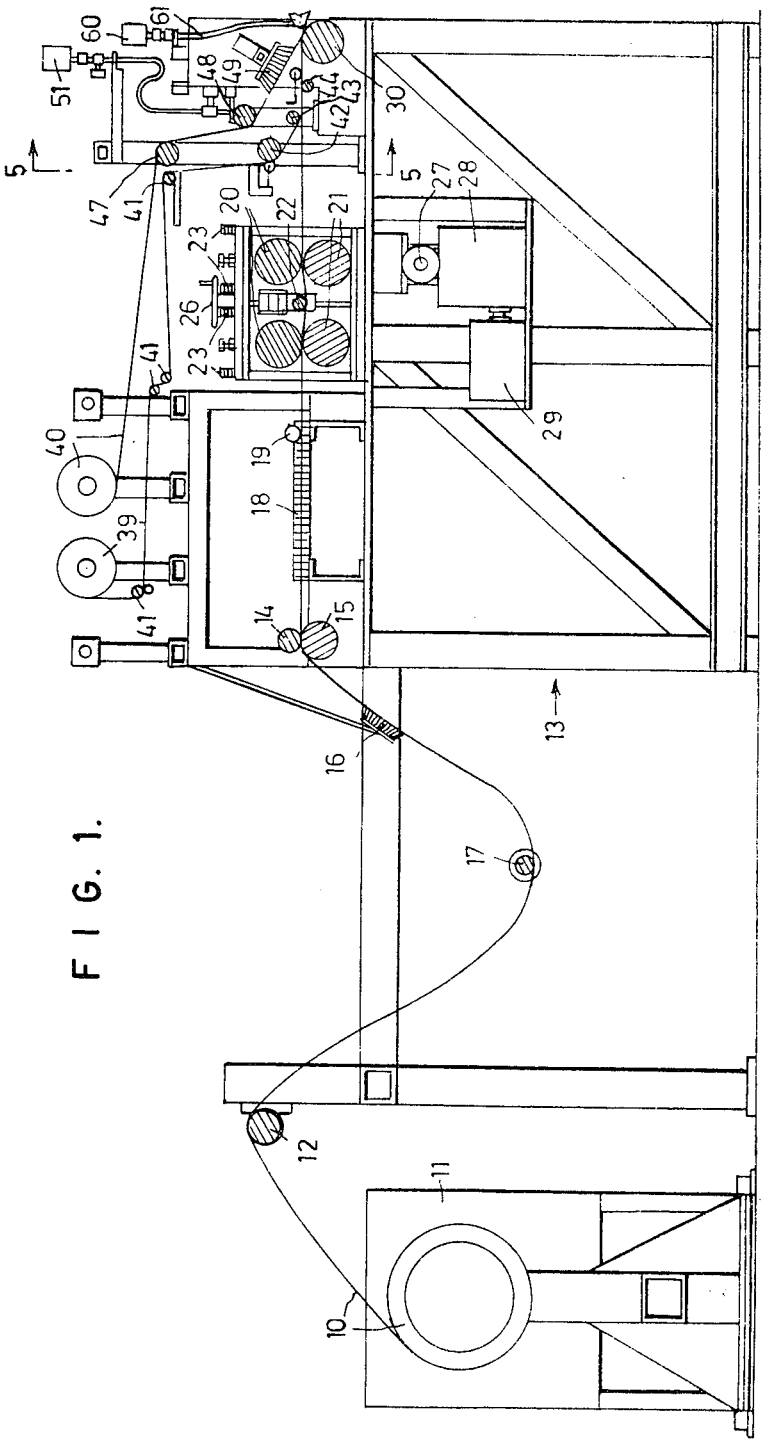

United States Patent [19]
Menzies

[11] 3,945,868
[45] Mar. 23, 1976

[54] METHOD OF APPLYING HEAT INSULATING MATERIAL TO SHEET METAL

[75] Inventor: John Ian Menzies, Brisbane, Australia

[73] Assignee: Heatshield Research and Development Pty., Ltd., Brisbane, Australia

[22] Filed: May 31, 1973

[21] Appl. No.: 365,700

[30] Foreign Application Priority Data
June 1, 1972 Australia.............................. 9173/72

[52] U.S. Cl. ................ 156/164; 156/309; 156/494; 156/583
[51] Int. Cl.² ......................................... B32B 31/08
[58] Field of Search ............ 156/160, 162, 163, 164, 156/184, 192, 324, 306, 309, 494, 499, 583; 161/216

[56] References Cited
UNITED STATES PATENTS

| | | |
|---|---|---|
| 3,150,024 | 9/1964 | Penman .............................. 156/229 |
| 3,589,975 | 6/1971 | Andrews et al...................... 161/165 |
| 3,725,169 | 4/1973 | Allen et al. ......................... 156/184 |
| 3,756,896 | 9/1973 | Kono .................... 156/495 |

FOREIGN PATENTS OR APPLICATIONS

1,078,041  11/1954  France................................ 156/306

*Primary Examiner*—William A. Powell
*Assistant Examiner*—Brian J. Leitten
*Attorney, Agent, or Firm*—Donald D. Jeffery

[57] ABSTRACT

Metal foil is applied to sheet metal by a film of polythene adhering to both and separating the two from direct contact, for improving the heat-insulating qualities of the sheet metal, by superimposing the film on the sheet metal, superimposing the foil on said film, and drawing the laminated assembly under tension along a convex curved surface, said foil next to said surface, and simultaneously heating said sheet metal to heat, by conduction, said film, heat and pressure on said foil causing it to bond to said foil and said film.

8 Claims, 13 Drawing Figures

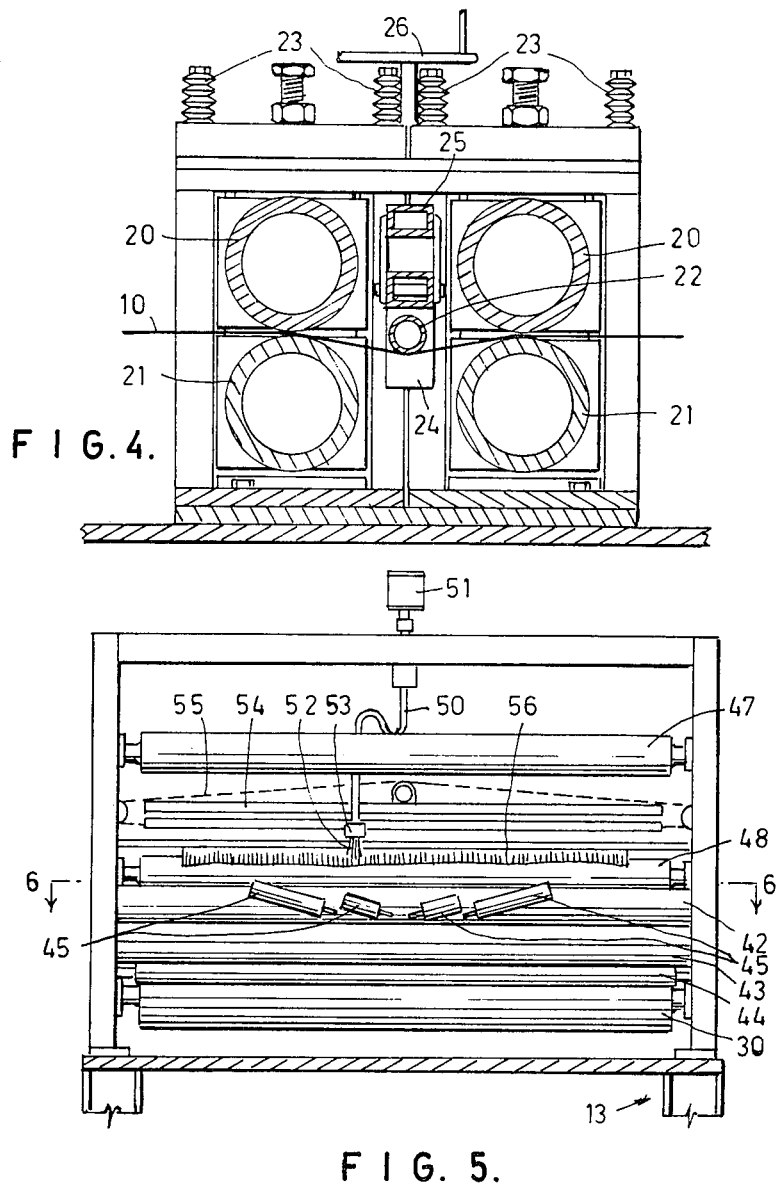

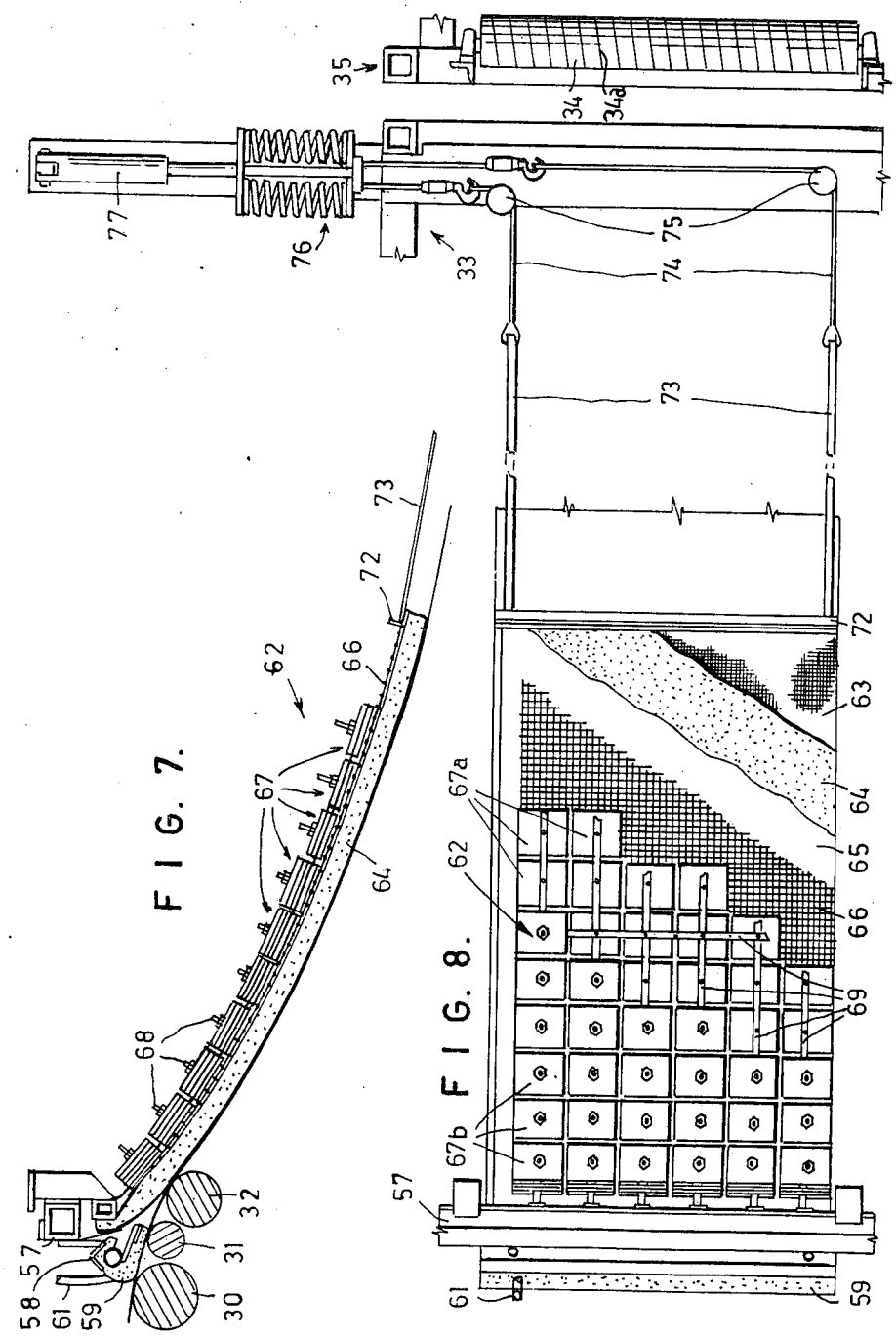

METHOD OF APPLYING HEAT INSULATING MATERIAL TO SHEET METAL

This invention relates to an improved method of and apparatus for applying heat insulating material to sheet metal.

The general object of the invention is to provide an improved method and apparatus for applying to sheet metal, normally galvanized sheet steel drawn as a fairly wide strip from a roll, insulating material consisting of metal foil, normally aluminium, and an interposed layer of polythene film which is heated to cause adhesion to the foil and the sheet metal whilst separating the two from direct contact.

Accordingly, the invention resides broadly, in one aspect in a process of bonding metal foil to sheet metal by an interposed film of polythene adhering to both and separating the two from direct contact, including the steps of superimposing the foil and film to the sheet metal, drawing the laminated material in tension along a convex curved member, the foil against the member, and simultaneously applying heat to the sheet metal, the heat conducted to the film and the pressure on the film within the curved tensioned laminated material causing bonding of the film to the foil and sheet metal. Preferably the process includes also the step of coiling the heated laminated product under tension for curing under prolonged heat and pressure.

In another aspect, the invention resides in apparatus for carrying out the process and including a longitudinally convex curved surface; means for superimposing metal foil and polythene film to sheet metal; means for drawing the laminated material under tension along the curved member, the foil next to the said member, and means for simultaneously heating the sheet metal to heat the film by conduction.

The invention also includes a laminated product made by the said process.

Figure 2:
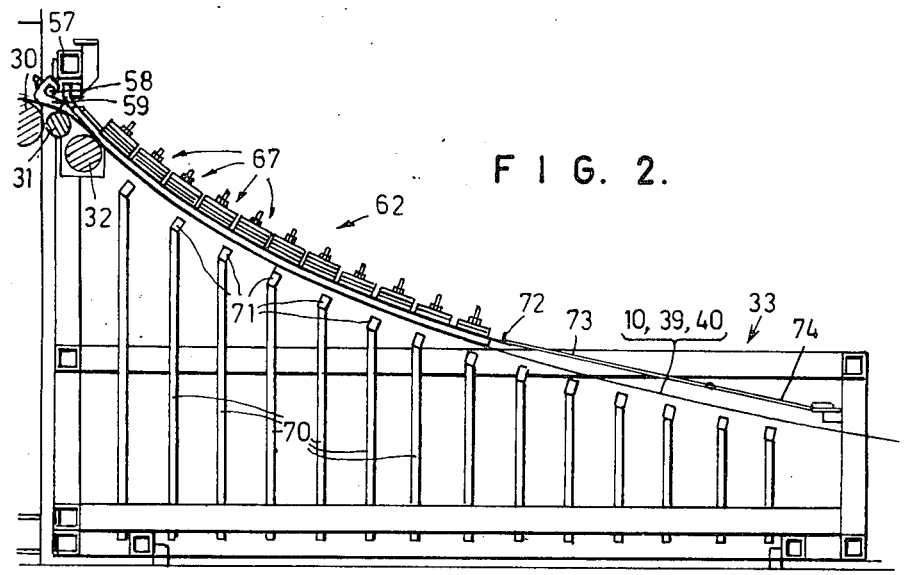
Figure 3:
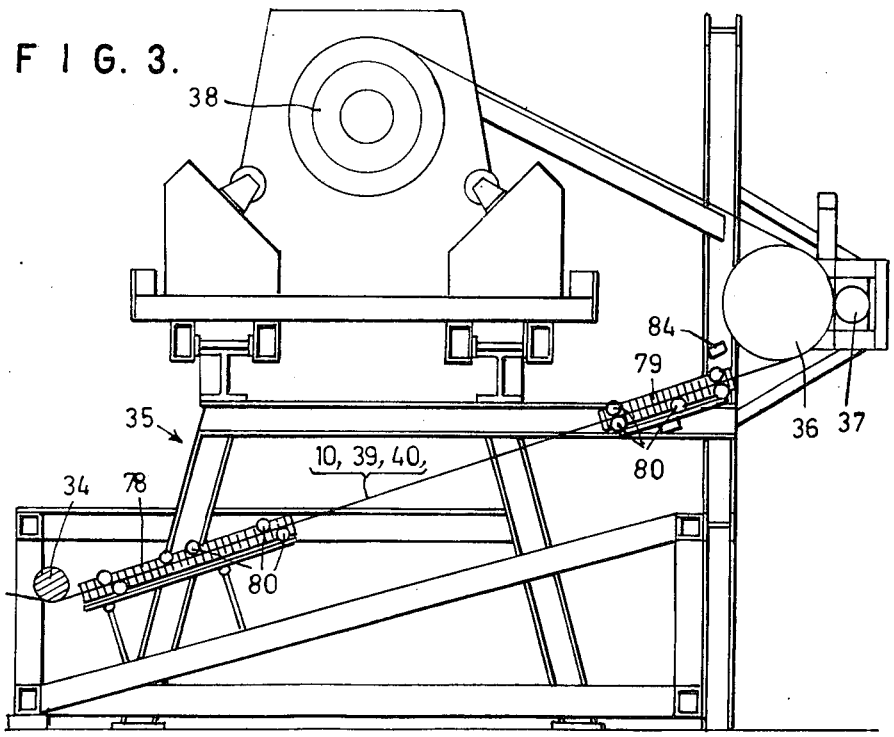
Figure 6:
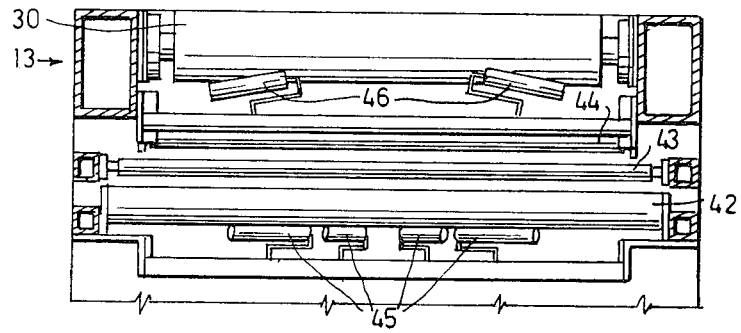

In the drawings:

FIGS. 1, 2 and 3 are schematic side elevational views of the application section, the heating and pressing section, and the re-coiling section respectively of a machine according to the invention, FIG. 4 is a sectional view, to enlarged scale, of the tension roller assembly of the machine, FIG. 5 is a sectional view to enlarged scale along line 5—5 in FIG. 1, FIG. 6 is a sectional view along line 6—6 in FIG. 5, FIG. 7 is a side elevation, to enlarged scale, of the weighted pressure pad assembly of the machine, FIG. 8 is a partly broken-away plan view of the weighted pressure pad assembly, and also the pressure pad lifting device, and FIGS. 9, 10, 11, 12 and 13 are diagrammatic views showing the operation of the edge covering and trimming means of the machine.

Referring initially to FIG. 1, a roll of galvanized sheet steel 10 is rotatably mounted on a stand 11, and may be driven by a suitable motor (not shown) to deliver the steel at controlled speed. From the roll, the steel is fed over an idler roller 12 at the rear end of an application section frame 13, and is fed between a pair of idler rollers 14 and 15, a brush 16 resting on, and cleaning, the upper surface of the steel. A weighted roller 17 lies across the loop of steel between roller 12 and rollers 14 and 15, and ensures that the steel is under sufficient tension to feed from the driven roll to the loop.

The steel is then guided horizontally between driven chain guides 18 of known type engaging its side edges, and the sides of the steel engaged by the chains are kept flat by shaped wheels 19.

The steel is then carried between two pairs of tension rollers, each pair consisting of an upper roller 20 and a lower roller 21, and it passes under a pivoted roller 22 positioned between the two pairs of tension rollers. The steel is pulled through this assembly of rollers as will be later explained, causing them to rotate. The tension rollers are interconnected by sprocket and chain arrangements (not shown) so that the upper tension rollers 20 rotate in the one direction, the lower tension rollers 21 in opposite direction, all at the same speed. The lower tension rollers 21 taper slightly from the middle to both ends, and the bearings for the shafts of the constant-diameter upper tension rollers 20 are heavily spring-loaded downwardly by adjustable springs 23 so that the pressure on the sheet steel is equalised from side to side. The springs 23 ensure that when there are occasional variations in thickness of the steel, from side to side, pressure on the steel does not vary significantly. The pivoting roller 22 as shown particularly in FIG. 4 depresses the steel between the two pairs of tension rollers 20, 21, and is rotatable in a transverse carrier 24 (FIG. 4) centrally pivoted about a longitudinal axis to an adjustable frame 25 so that if one side edge of the sheet metal should be stretched and therefore longer than the other the pivoted roller 22 will take up a tilted position assisting in guiding the steel straight. The adjustable frame 25 may be raised or lowered and the limits of the tilting movement of the pivoted roller 22 may be set by an adjustment handwheel 26. One of the lower tension rollers 21 is connected through a chain drive (not shown) to a countershaft 27 (FIG. 1) which in turn is operatively connected through a gearbox 28 to a hydraulic pump 29 which when driven circulates hydraulic fluid through a restricted orifice action as a brake for the tension rollers. The sheet steel is carried over an arrangement of three parallel transverse idler rollers 30, 31 and 32, the first of these being on the front of the application section frame 13, and the others being on the rear of the frame 33 of the heating and pressing section (FIG. 2). The sheet is unsupported between roller 32 and an idler roller 34 at the rear of the frame 35 of the recoiling section (FIG. 3). The steel is carried under this roller 34 around between a roller 36 at the rear of the frame and springloaded nip roller 37 and onto a recoiling roller 38 which is driven so that the steel between the assembly of tension rollers 20 and 21 and the recoiling roller 38 is in a state of tension when the machine is in operation and is pulled through the machine at a controlled speed.

A roll of transparent polythene film 39, and a roll of aluminium foil 40, are mounted on the frame 13 of the application section. Polythene film is drawn from its roll and, guided by rollers 41, is carried forwardly and then brought down behind and under parallel transverse cylindrical bars 42 and 43 and, as the sheet steel 10 is drawn close under the lower bar 43, the polythene film is at or near to this point brought down onto the steel and is carried forward with it in superimposed arrangement, over a small support roller 44, and over the three rollers 30, 31 and 32 which, as shown particularly in FIG. 7, are arranged to impart curvature to the steel drawn over them.

To prevent longitudinal tension of the polythene film from causing it to contract laterally, four oblique resilient rollers 45 (see FIG. 5) are mounted to bear, with adjustable pressure, on the film where it is drawn past the fixed bar 42; and as shown in FIG. 6, a further pair of resilient oblique rollers 46 are mounted to bear with adjustable pressure on the polythene film 39 where it is superimposed on the sheet steel 10, above support roller 44. The action of these oblique rollers 45 and 46 is primarily to urge the side parts of the film outwards, to give lateral tension to the film, but also, by increasing the friction of the film passing the bar 42 to impart some longitudinal tension to the film.

Aluminium foil 40 drawn forwards from its roll is passed over a transverse roller 47 and under a transverse roller 48 before being brought down onto the polythene film 39 and steel 10 being drawn over the rollers 30, 31 and 32. Tension in the foil is equalised by carrying it under a resilient transverse brush 49.

Lubricating fluid, such as dimethyl siloxane of approximately 100 centistrokes viscosity, is applied to the upper surface of the foil 40 before it is superimposed on the film and steel. As shown in FIG. 5, the lubricant is conveyed by a flexible hose 50 from a reservoir 51 to a feeder brush 52 mounted on a traveller 53 reciprocated along a transverse guide rail 54 by an automatically reversing chain drive 55. The feeder brush feeds lubricant to a transverse applicator brush 56 contacting the roller 48 which in turn transfers the lubricant to the foil.

The frame 33 of the heating and pressing section has across its rear end a transverse member 57 below which is mounted a transverse pressure bar 58 covered by a pad 59 of compressed polyurethane foam, which bears on the superimposed laminations of foil, polythene and steel curving over the rollers 30, 31 and 32 to smooth the foil and expel entrapped air.

The polythene film and the aluminium foil are of about the same width, and a little narrower than the steel 10. The film is applied to the steel in laterally offset manner so that a strip of one side of the steel is uncovered by the film, which at the other side slightly overlaps the steel. The foil is offset slightly more in the same direction, so that one side strip of the film is uncovered by the foil, which at the other side extends beyond the film. This ensures that, despite any variations in the width of foil or film, the foil nowhere directly contacts the steel, polythene film always being interposed between the two.

The uncovered strip at one side of the polythene film has a lubricant, which may be the same as that applied to the foil, applied thereto from a reservoir 60 through a hose 61 to the appropriate side of the pad 59, through which it is applied to the strip of exposed film.

A large part of the laminated assembly of steel, film and foil which is suspended between the rollers 32 and 34 is covered by a weighted pressure pad assembly indicated generally at 62. This includes, referring to FIG. 7, a rectangular sheet 63 of flexible fibre-glass cloth, its rear end fixed to transverse member 57, and over this woven sheet is a resilient pad 64 of heat-insulating material, covered by a rectangular section 65 of flexible sheet metal, both having their rear ends connected to the transverse member 57. Over the sheet metal section 65 is a panel 66 of flexible mesh, and over the mesh are a number of weights 67 in longitudinally and laterally aligned arrangement. Each of the weights includes a rectangular bottom plate 67a with a central rod 68 extending perpendicularly upwards, the weights being held in position by passing these rods 68 through apertures in a series of flexible metal straps 69 extending from the transverse member 57. One or more centrally apertured supplementary plates 67b may be engaged on each central rod 68, and the curvature of the unsupported assembly of steel, film and foil, as well as the pressure applied thereto, may be varied as required by alteration of the weights.

The heating and pressing section frame 33 is provided at both sides with pairs of vertically adjustable standards 70 interconnected to their upper ends by transverse gas jet manifolds 71, each connected to a controlled source of supply of gas and having a multiplicity of gas jet orifices from one side to the other. The heights of the standards 70 are adjusted so that the gas jet manifolds are substantially equidistantly spaced below the curved sheet steel 10.

During the operation of the machine, the advancing sheet steel 10 is heated by the ignited gas jets, to heat by conduction the superimposed polythene film 39 and aluminium foil 40. As the laminated arrangement is drawn under the convex curve of the weighted flexible pressure pad assembly 62, the heat and pressure cause the polythene film to melt and adhere to the steel and the foil, bonding them together, but also separating the foil from the steel by a thin lamination of transparent polythene.

An angle section 72 is secured across the front end of the weighted pressure pad assembly 62, and from this there lead forward a pair of straps 73 connected to cables 74 which are carried around a pair of pulley wheels 75 at the front of the frame 33 and operatively connected to an assembly of compression springs 76 which, during the operation of the machine, are compressed by the extended piston of a hydraulic cylinder 77.

Control means (not shown) of any suitable type are provided whereby, if the travel of the sheet steel 10 through the machine should be interrupted, or in the event of a malfunction of the machine, the supply of gas to the gas jet manifolds 71 is immediately discontinued, and instead cool air is directed through the gas jets. At the same time, the piston of the hydraulic cylinder 77 is automatically retracted, so that the springs 76 tension the cables 74 to lift the weighted pressure pad assembly 62 further from the hot gas jet manifolds 71 to prevent overheating of the stationary laminated arrangement of steel, polythene and foil. Also by suitable braking means (not shown) the rotation of the rolls of steel polythene film and aluminium foil is checked, to prevent over-run.

The idler roller 34 under which the laminated steel, film and foil is passed, is mounted on the frame 35 in tiltably adjustable manner so that either side may be raised or lowered to assist in steering the laminated product; and it is formed with a shallow helical groove 34a. As the laminated product is drawn under this roller, excess of the foil due to expansion by heat, which would otherwise tend to form wrinkles, is induced by the helical groove to form a pattern of parallel lines, and the helical groove also assists in eliminating any minor bubbles of trapped air.

Figure 9:
Figure 10:
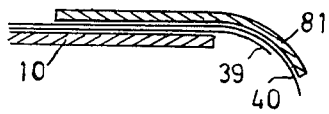
Figure 11:
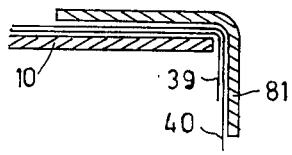
Figure 12:
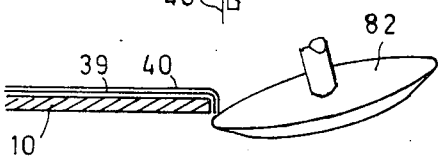
Figure 13:
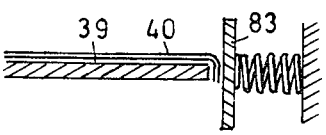

The laminated product is guided to engage, at one side with two driven chain guides 78 and 79, FIG. 3, with associated wheels 80 for keeping the product flat near to these guides. At the other side of the laminated product, the film and foil overlap the steel 10, as before described, and there is provided an assembly, shown schematically in FIG. 9 to 13 for covering the side edge of the steel 10 with film and foil, and trimming away excess film and foil. FIG. 9 shows the side edge of the sheet steel 10 with superimposed polythene film 39 extending beyond the steel, and aluminium foil 40 extending further. FIG. 10 shows the side of the laminated assembly brought under an edge guide 81, which commences to bend the foil and film sharply down, as the laminated product has further advanced. FIG. 12 shows the laminated product, moved beyond the guide 81, and acted on by a rotary cutter 82, which cuts away the foil and film extending below the edge of the sheet steel 10; and FIG. 13 shows the edge of the product brought past a spring-loaded pad 83 which passes the laminations of polythene film and foil against the side edge of the steel. The steel is sufficiently heated at this stage to ensure a good bond between the polythene, and the edge of the steel and the foil. The covering of the edge of the steel protects against corrosion, and also makes the edge less likely to cut or damage articles with which it comes in contact.

As the laminated product is carried around roller 36, it is further heated, as this roller is heated by a gas jet manifold 84 generally similar to the gas manifolds 71. The laminated product is tightly wound on the re-coiling roller 38, and when re-coiling has been completed, the roll may be removed and stored for curing. It is found that the curing of the heated product under pressure on the roll greatly improves the bond between the laminations.

The product may be roll-formed into any desired profile, for roofing sheets or other purposes. It will be found that the product has good heat insulating qualities when installed with the sheet steel 10 nearer to a source of heat; for example uppermost when the product is used for roofing. It is understood that a significant proportion of heat radiated from the underside of the steel passes through the transparent polythene film to the foil, from which it is reflected back through the film to the steel. Furthermore, the surface of the aluminium foil remote from the heat source is a very poor emitter of radiant heat. Experiments have shown that heat insulating qualities brought about by the application of the polythene film and the metal foil to sheet steel, and applied to roofing, is comparable to the results obtained by the use of other well-known heat insulating materials, such as foil-faced kraft paper installed under untreated sheet steel.

Apparatus according to the invention will be found to be very effective in the production of sheet metal to which the heat insulating laminations of film and foil are applied, the product being capable of being subsequently roll-formed to required profile. It will of course be understood that the particular embodiment described and illustrated may be subject to many modifications within the scope of the invention.

What I claim is:

1. A method of bonding metal foil to sheet metal by an interposed film of polythene which is adhered to both and which separates the sheet metal and metal foil from direct contact, comprising the steps of:

a. drawing said sheet metal from a roll,
    b. separately drawing said film and superimposing said film on said moving sheet metal,
    c. separately drawing said foil and superimposing said foil on said film,
    d. suspending said laminate between longitudinally spaced rollers,
    e. applying weight and pressure to the laminated assembly of foil, film and sheet metal while in tension and so suspended by contacting and covering said laminate with a plurality of spaced weights which apply pressure by virtue of such weight to said laminate, and
    f. applying heat to the underside of said sheet metal at least in the area below said weights, such heat melting said film and causing bonding of said film to said foil and said sheet metal due to the pressure applied to the laminate by said weights and the tension on the laminate.

2. A method according to claim 1 including the further steps of coiling said laminated assembly under tension, and applying heat to said laminate just before coiling for curing said film.

3. The method of claim 1 further including the step of applying adjustable laterally outward pressure on said film just prior to and at its point of contact with said sheet metal thereby preventing undesired longitudinal tension in said film.

4. The method of claim 1 further including the steps of laterally offsetting said film on said sheet metal so that one side edge of the sheet metal is exposed and the other side edge thereof is overlapped by said film, offsetting said foil on said film so that one side of the film is exposed and the other side overlapped by said foil, whereby said film is always interposed between said sheet metal and said foil, covering the overlapped side edge of said sheet metal with said film and foil, cutting away the overlapped edges of said film and foil, and pressing said film and foil against the covered side edge of said sheet metal, with the residual heat in said sheet metal bonding said foil to said sheet metal along said edge.

5. The method of claim 1 further including the step of adjustably tensioning said weights thereby permitting said weights to be lifted away from the source of heat to prevent overheating of the laminate when the travel of the laminate is interrupted.

6. The method of claim 1 wherein the application of heat is by gas burners equidistantly spaced below said sheet metal and extending longitudinally below said weights so as to apply heat to the laminate throughout its travel below said weights.

7. The method of claim 1 including the step of adjustably varying the pressure of said weights on said laminate by individually installing or removing weight members carried by flexible supporting members.

8. The method of claim 1 further including the step of forming in said foil a pattern of parallel lines during travel of said foil over the front roller of said spaced rollers, thereby accommodating expansion in said foil resulting from the heating process.

* * * * *